United States Patent
Tu

(10) Patent No.: US 7,272,489 B2
(45) Date of Patent: Sep. 18, 2007

(54) NAVIGATION METHOD AND SYSTEM FOR EXTRACTING, SORTING AND DISPLAYING POI INFORMATION

(75) Inventor: Ihung S. Tu, Anaheim, CA (US)

(73) Assignee: Alpine Electronics, Inc., Tokyo (JP)

( * ) Notice: Subject to any disclaimer, the term of this patent is extended or adjusted under 35 U.S.C. 154(b) by 769 days.

(21) Appl. No.: 10/198,596

(22) Filed: Jul. 18, 2002

(65) Prior Publication Data

US 2004/0204821 A1 Oct. 14, 2004

(51) Int. Cl.
*G01C 21/26* (2006.01)
(52) U.S. Cl. .................................... 701/200
(58) Field of Classification Search ................ 701/200, 701/23, 202, 205, 209, 211, 213; 340/990, 340/995
See application file for complete search history.

(56) References Cited

U.S. PATENT DOCUMENTS 6,009,403 A * 12/1999 Sato ............................. 705/6

2002/0013815 A1 * 1/2002 Obradovich et al.
2003/0065805 A1 * 4/2003 Barnes, Jr.

FOREIGN PATENT DOCUMENTS

| JP | 10-030931 | 2/1998 |
| JP | 2001-050768 | 2/2001 |

* cited by examiner

*Primary Examiner*—Thu V. Nguyen
(74) *Attorney, Agent, or Firm*—Muramatsu & Associates

(57) ABSTRACT

A navigation method and system for extracting point of interest (POI) data from a map data source and sorting the POIs by distance from a current user position to display the same at high speed without requiring a large memory. The navigation system aligns the cells each having specified POI in an cell array and classifies the cells into a plurality of different levels based on distance (first sorting operation) from the current user position, or positions of the cells in the cell array relative to the cell closest to the user position. The navigation system extracts the POIs from the cells in the specified level, sorts the POIs by distance (second sorting operation), and displays the POIs. During each process, the navigation system retrieves and processes only a small amount of POIs sufficient for the current display screen and immediate scrolls of few pages.

24 Claims, 18 Drawing Sheets

Sorted Distance Cell Array

| Cell ID | 8 | 10 | 13 | 16 | 21 | 1 | 3 | 5 | 6 | 11 | 24 | 26 | 28 |
|---|---|---|---|---|---|---|---|---|---|---|---|---|---|
| Distance No. | 1 | 1 | 1 | 1 | 1 | 2 | 2 | 2 | 2 | 2 | 2 | 2 | 2 |

Fig. 3A — Prior Art
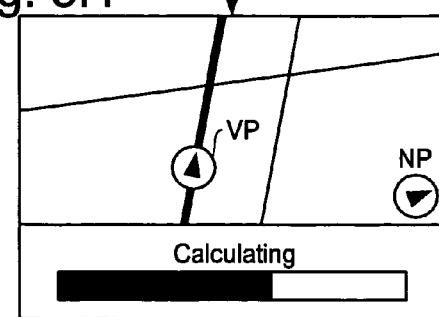

Fig. 6

| 25 | 26 | 27 | 28 | 29 | 30 |
|----|----|----|----|----|----|
| 19 | 20 | 21 | 22 | 23 | 24 |
| 13 | 14 | 15 | 16 | 17 | 18 |
| 7  | 8  | 9  | 10 | 11 | 12 |
| 1  | 2  | 3  | 4  | 5  | 6  |

Fig. 7

Populated Cell Array

| 1 | 3 | 5 | 6 | 8 | 10 | 11 | 13 | 16 | 21 | 24 | 26 | 28 |
|---|---|---|---|---|----|----|----|----|----|----|----|----|

Sorted Distance Cell Array

| Cell ID | 8 | 10 | 13 | 16 | 21 | 1 | 3 | 5 | 6 | 11 | 24 | 26 | 28 |
|---|---|---|---|---|---|---|---|---|---|---|---|---|---|
| Distance No. | 1 | 1 | 1 | 1 | 1 | 2 | 2 | 2 | 2 | 2 | 2 | 2 | 2 |

Out of order POI

Fig. 12
Fig. 13
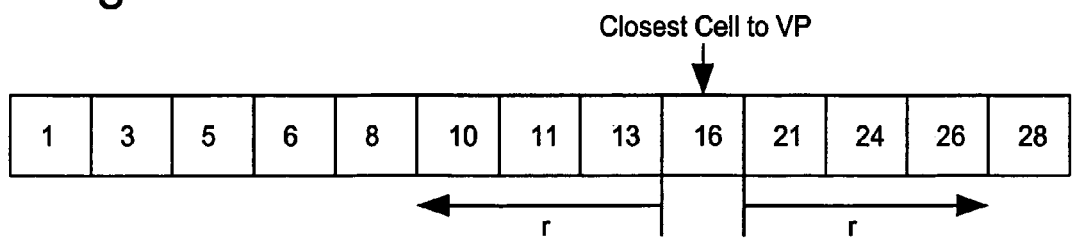
Fig. 14A
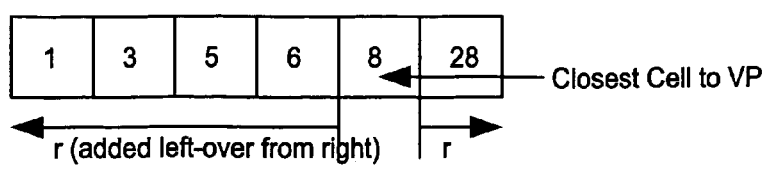
Fig. 14B

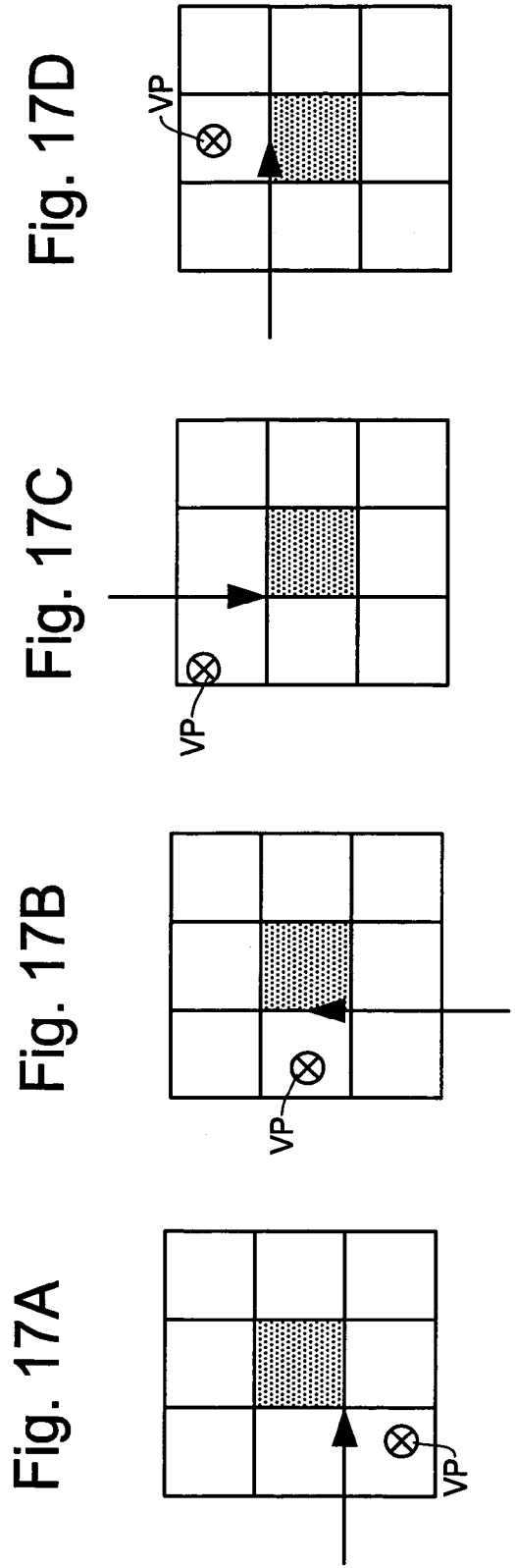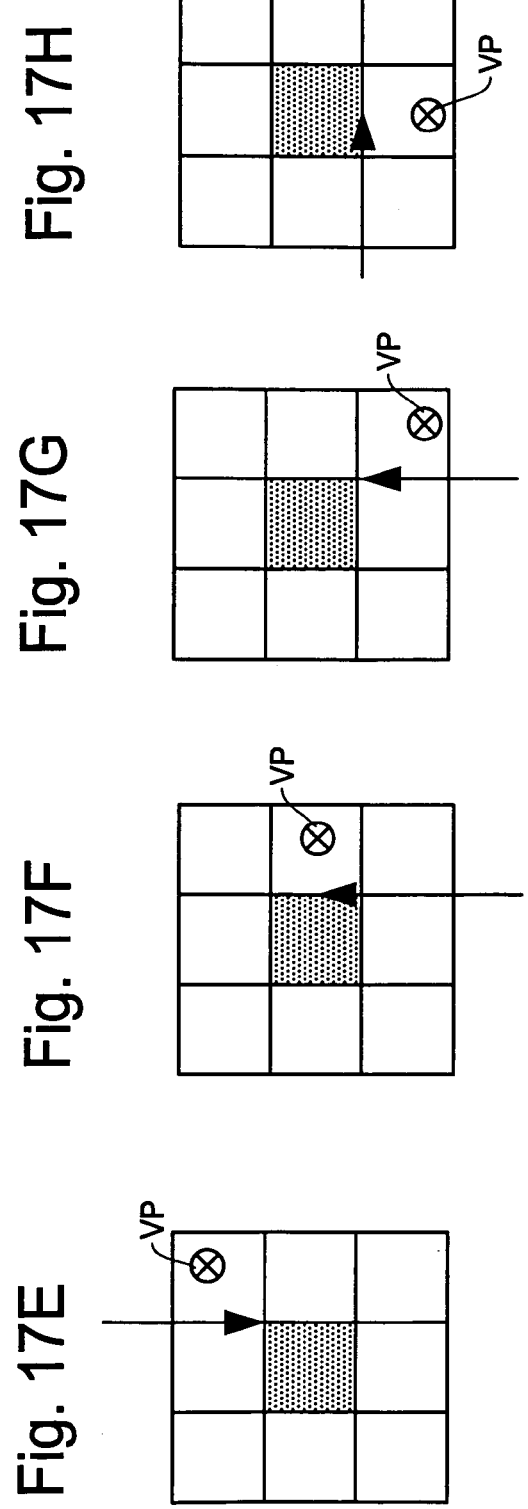

| 1 | 5 | 6 | 8 | 11 | 16 | 21 | 26 | 28 |

Fig. 23

| Cell ID | 1 | 5 | 3 | 7 | 8 |
|---|---|---|---|---|---|
| Distance Level | 1 | 1 | 2 | 2 | 2 |

Fig. 24

| Cell ID | 8 | 16 | 21 | 1 |
|---|---|---|---|---|
| Distance Level | 1 | 1 | 1 | 2 |

Fig. 25

| Cell ID | 8 | 16 | 21 | 1 | 5 | 6 | 11 | 26 | 28 |
|---|---|---|---|---|---|---|---|---|---|
| Distance Level | 1 | 1 | 1 | 2 | 2 | 2 | 2 | 2 | 2 |

NAVIGATION METHOD AND SYSTEM FOR EXTRACTING, SORTING AND DISPLAYING POI INFORMATION

FIELD OF THE INVENTION

This invention relates to a method and apparatus for extracting map information for use in a navigation system, and more particularly, to a method and apparatus for extracting point of interest (POI) information from a map data source and sorting the POI information by distance from a predetermined position to display the same at high speed without using a large memory or high level processor.

BACKGROUND OF THE INVENTION

A navigation system performs travel guidance for enabling a user to easily reach the selected destination. A typical example is a vehicle navigation system. The present invention is not limited to a vehicle navigation system but is applicable to other types of navigation system such as a PDA (Personal Data Assistant), a cellular phone, and other portable navigation devices. However, for the convenience of explanation, the following description is made mainly for the vehicle navigation system.

Such a navigation system detects the position of the vehicle, reads out map data pertaining to an area at the vehicle current position from a data storage medium, for example, a CD-ROM (compact disk read-only memory) or a DVD (digital versatile disc), and displays a map image on a monitor screen (display) while superposing a mark representing the current location of the vehicle on a predetermined portion of the map image. Alternatively, such map data can be provided to the vehicle from a remote server through a communication network such as Internet.

The vehicle position is determined by a self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the map image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

FIG. 1A shows an example of a locator map display containing a current vehicle position mark VP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

FIG. 1B shows an example of route guidance display which performs the route guidance function. The route guidance display is activated after specifying the destination. In this example, the current street "W 190TH ST" and the left side of the next street "PRAIRIE AVE" will be highlighted in the map image 21 to show the direction of turn at the next intersection. In addition, this example further shows an arrow indicating the direction (left) in which the vehicle is to turn at the intersection in a guidance information box 22 at the top of the screen. The guidance information box 22 also shows the name of the street "PRAIRIE AVE" which intersects with the current street "W 190TH ST" and a distance to the intersection. Thus, the navigation system indicates that the vehicle should make a left turn at the intersection with "PRAIRIE AVE".

Further to the highlighted display, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. FIGS. 2A-2C show examples of display shown on the monitor screen during the operation of inputting the destination.

By operating a menu key, a main menu screen 25 such as shown in FIG. 2A is displayed on the navigation system and a menu item "Destination" is selected from the main menu. This allows the navigation system to display an "Enter Destination by" screen 27 as shown in FIG. 2B for specifying an input method for selecting the destination. The "Enter Destination by" screen 27 lists various methods for selecting the destination including "Address" for specifying the city and address of the destination, "Intersection" for specifying the names of two streets in the city which intersect with one another, and "Point of Interest" (POI) for selecting the programmed destination based on the name, category or telephone number.

Other methods in the "Enter Destination by" screen 27 include "Recent Route" for specifying the destination based on the recent destinations saved in the navigation system, "Address Book" for selecting the address of the destination out of the addresses stored in the system, and "Today's Plan" for specifying two or more destinations in the navigation system. For example, when a user wants to go to several destinations before the final destination, the navigation system calculates an efficient order and routes to such destinations.

When selecting, for example, the "Address" in FIG. 2B, the navigation system displays an "Enter Street Name" screen such as shown in FIG. 2C. The screen of FIG. 2C is basically a key board 38 for inputting the city and address in an address input box 37 on the monitor screen. The user inputs the street name and number in the address input box 37 through the key board 38.

After inputting the destination, the navigation system determines a route to the destination based on, for example, the shortest way to reach the destination, the route using many freeways as possible or the route without using toll road, and the like. Thus, the navigation system moves to the route guidance display such as shown in FIG. lB to guide the user to the destination.

This invention is directed to a method and apparatus for a navigation system using the input method of "Point of Interest" noted above. Typically, a specific category of point of interest (POI) information is searched and displayed based on an order of distance from a current user position. Although the "Point of Interest (POI)" input method is convenient and useful, because the recent storage medium provides a large volume of data showing POI information, it requires a large memory and a relatively long time for extracting and processing the POI information to display the POI information sorted by distance.

An example of process for specifying a destination through the "Point of Interest" is carried out in the following manner with reference to FIGS. 3A-3F. In the example of FIGS. 3A-3F, it is assumed that an intended destination is a Japanese restaurant "Taiko" in Irvine, Calif. FIG. 3A shows an example of screen listing the various input methods noted above for selecting the destination. As shown in this example, typically, the navigation display lists several items, such as up to seven or eight items per page as a maximum number. Therefore, when the number of items exceeds the maximum number, it is usually necessary to scroll the display to see the other items outside of the current screen.

In FIG. 3A, by selecting the "Point of Interest" and hitting an enter key, the navigation system displays a screen shown in FIG. 3B for finding the point of interest by either place names or place types. As shown in this example, this screen typically lists only two items. In FIG. 3B, by selecting the "Place Type" and pressing the enter key, the navigation system displays a screen shown in FIG. 3C for selecting the categories of the point of interest. This screen lists various different categories of point of interest such as "ATM", "Automotive", "Bank", "Restaurant", "Hotel", "Shopping" and others. Typically, the number of such categories are as many as forty or more. Therefore, in many cases, such a category list must be scrolled to find a favorite place type on the screen.

By selecting the category type "Restaurant" in FIG. 3C, the navigation system displays another category select screen listing sub-categories of the selected category. In this case, the sub-category screen shows types of food such as "American", "Californian", "Chinese", "French", "Italian", "Japanese", "Korean" and etc. Sometimes, such a sub-category list extends to several pages, requiring page scrolling to find a favorite sub-category.

By selecting the sub-category "Japanese" and pressing the enter key in FIG. 3D, the navigation system displays a screen for selecting a method of finding the places as shown in FIG. 3E. In this example, the methods include "Sort by Distance", "Name" and "Within a city". The "Sort by Distance" method is to find the places, Japanese restaurants, in this case, in the order of distance from the vehicle current position. The "Name" method is to find the places by inputting the name of the Japanese restaurant through, for example, a key board. The "Within a City" method is to let users select a city name and then to list the places, i.e., Japanese restaurants within the city.

By selecting the "Sort by Distance" and hitting the enter key in FIG. 3E, the navigation system displays a list of Japanese restaurants in the order of distance from the current vehicle position as shown in FIG. 3F. The screen of FIG. 3F is to select one of the place names in the list. Typically, the list also includes a distance from the current vehicle position and a direction from the current vehicle position for each place name in the list. In the case where two or more restaurants having the same name exist, such restaurants will be listed in the order of the distance from the vehicle position.

The user selects the name "Taiko" in FIG. 3F and presses the enter key. Then, the navigation system displays a confirmation route screen such as shown in FIG. 3G for confirming the destination. The screen of FIG. 3G shows the name, address and phone number of the selected destination. Although not shown in the example of FIG. 3G, such a confirmation screen may also show the distance to the destination, an anticipated time length to reach the destination, and the direction to the destination.

By selecting "OK to Proceed" in FIG. 3G, the navigation system calculates the optimum route to the destination in FIG. 3H. The navigation system determines the route to the destination based on, for example, the shortest way to reach the destination, the route using many freeways as possible or the route without using toll road, and the like. During this process, the navigation system shows a progress of calculation by a bar graph as shown in the lower part of FIG. 3H. Then, the navigation system moves to the route guidance display such as shown in FIG. 1B which performs the route guidance.

In the foregoing example, the process of specifying the destination by the "Point of Interest" (POI) requires a step of searching (extracting) the specified POI information (ex. Japanese restaurant) for an area as large as an entire country. The process further requires a step of sorting the acquired POI information to display in the order of distance from the current vehicle (user) position. In the map data storage medium, such as DVD, an entire area covered by the navigation system is divided into a large number of cells in a manner shown in FIG. 6.

Typically, the navigation system searches the specified POI information for consecutively accessing the cells in a spiral fashion starting from the current vehicle position. The navigation system collects the POI information by spirally and outwardly accessing the cells until either a predetermined number of POIs are collected or all the cells in an entire covering area are searched. For example, the predetermined number of POIs is 1,000. Because the recent storage medium such as DVD provides a large number of cells and a large number of POIs, it requires a relatively long time, such as ten seconds or more to extract the information and to sort the information by distance. Further, because the large volume of information has to be processed, the navigation system has to use a high speed processor and a large memory for temporarily storing the information for the processing.

SUMMARY OF THE INVENTION

It is, therefore, an object of the present invention to provide a navigation method and system for quickly and accurately searching map information such as POI (point of interest) and displaying the extracted information sorted by distance without requiring a large memory.

It is another object of the present invention to provide a navigation method and system for quickly and accurately retrieving and sorting an amount of POI data sufficient for a current display size and immediate display scrolls follow from the current display.

It is a further object of the present invention to provide a navigation method and system which is designed to access only a limited number of cells sufficient to obtain POI information in a practical use by a user.

In the present invention, the navigation method and system is designed to extract and sort map information, typically, POI (point of interest) information, by an amount only necessary for current display on the navigation system. The navigation method comprises the steps of: specifying a category of POI in a navigation system for displaying a list of specified POIs, collecting a predetermined number of populated cells from a cell matrix and producing an array of populated cells where a populated cell is a cell having at least one specified POI therein, sorting the cells in the populated cell array by distance from a specified position such as a current user position, retrieving the specified POIs from a first distance level of sorted populated cells and sorting the retrieved POIs by distance from the current user position, displaying and scrolling a list of specified POIs in the order of distance from the current user position, and repeating foregoing steps for a next distance level of populated cells when POIs to be displayed are insufficient for further scroll request.

In the navigation method of the present invention, the process of collecting the populated cells determines the predetermined number of populated cells based on the type of POI category specified by a user in such a way to retrieve a sufficient number of specified POIs to be displayed and scrolled on the navigation system. For example, the sufficient number of specified POIs is about several tens, which are displayed as the list of POIs with several pages of scroll.

In the present invention, the navigation method includes a step of detecting an out of order POI having a distance from the current user position larger than the first distance level and temporarily storing the out of order POI in a buffer memory. The out of order POI is retrieved from the buffer memory and inserted in a list of POIs extracted from the next or higher distance level of populated cells to be displayed in the order of distance from the current user position.

In another aspect of the present invention, the navigation method comprises the steps of: specifying a category of POI in a navigation system for displaying a list of specified POIs, collecting a predetermined number of populated cells from a cell matrix formed in a map data storage and producing an array of populated cells wherein the cells in the populated cell array are aligned based on positions in the cell matrix, determining a populated cell which is closest to a current user position and selecting a prescribed number of cells adjacent to the closest cell to establish a first level of populated cells consisting of the closest cell and the adjacent cells, sorting the populated cells in the first level by distance, retrieving the specified POIs from the first level of cells and sorting the retrieved POIs by distance from the current user position, displaying and scrolling a list of specified POIs in the order of distance from the current user position, and repeating foregoing steps for a next level of populated cells when POIs to be displayed are insufficient for further scroll request.

A further aspect of the present invention is a navigation system configured by various means for achieving the navigation method described above which accesses only a limited number of cells sufficient to obtain POI information in a practical use by a user.

According to the present invention, the navigation method and system is designed to process a small amount of POI information which is immediately necessary for a practical use by a user. Accordingly, the navigation method and system is able to quickly retrieving, sorting and displaying the POI information without requiring a large memory or a high power computer. When it is really necessary, the navigation method and system repeats the extracting and sorting operations for the next level of POI information. Therefore, the present invention can provide a navigation system with high speed and low cost.

BRIEF DESCRIPTION OF THE DRAWINGS

FIG. 2A is a main menu, FIG. 2B is a destination set menu and FIG. 2C shows a key board display for entering the destination.

FIGS. 3A-3H are schematic diagrams of display example showing a process of specifying the destination in the navigation system with use of a "Point of Interest (POI)" input method in the conventional technology.

FIG. 6 is a diagram showing an area which is divided into small cells (regions) each being designated by a cell ID for searching specified POIs where shaded cells include the specified POIs.

FIG. 7 is a diagram showing an array of cells (populated cells) each having the specified POIs which correspond to the shaded cells of FIG. 6.

FIG. 8 is a diagram showing a concept of selecting the populated cells of FIG. 6 based on a distance from a current user (vehicle) position in the first embodiment of the present invention.

FIG. 9 is a diagram showing an array of the populated cells with cell IDs aligned in the order of the distance from the current user position.

FIG. 12 is a diagram showing an array of cells and a current user position for explaining a process of reducing the number of cells to be retrieved for sorting and displaying the POI information in the second embodiment of the present invention.

FIG. 13 is an array of cells each having the specified POIs which correspond to the shaded cells shown in FIG. 12.

FIGS. 14A and 14B are diagrams showing a cell selection process in the second embodiment of the present invention where FIG. 14A shows an array of cells each having the specified POIs where a predetermined number of cells adjacent to the cell closest to the vehicle position are selected from the cell array in the first level, FIG. 14B shows cells selected in the second level based on positions closest to the vehicle position other than that selected in the first level.

FIGS. 17A-17F are diagrams showing various examples for determining a closest distance of a particular cell from the current user (vehicle) position.

FIG. 23 is a diagram showing a process in the third embodiment of the present invention for selecting and sorting the populated cells in the second level.

FIG. 24 is a diagram showing a process in the third embodiment of the present invention for selecting and sorting the populated cells in the first level corresponding to a first distance level in FIG. 23.

FIG. 25 is a diagram showing a process in the third embodiment of the present invention for selecting and sorting the populated cells in the first level corresponding to a second distance level in FIGS. 23 and 24.

DETAILED DESCRIPTION OF THE INVENTION

Figure 1A:
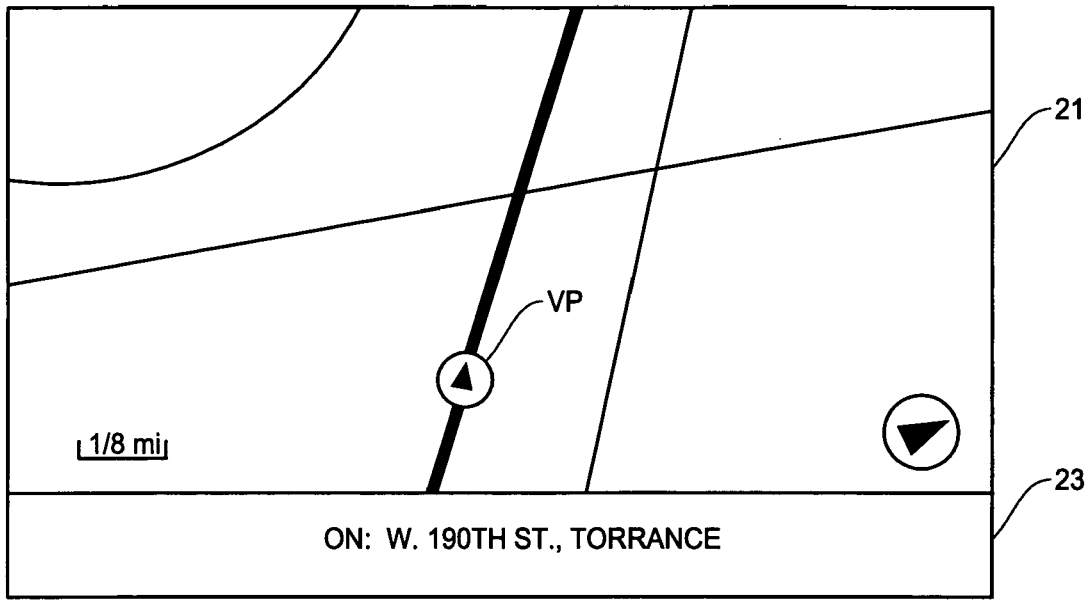
FIGS. 1A and 1B are schematic diagrams showing an example of locator map display and route guidance display, respectively, of a navigation system.
Figure 1B:
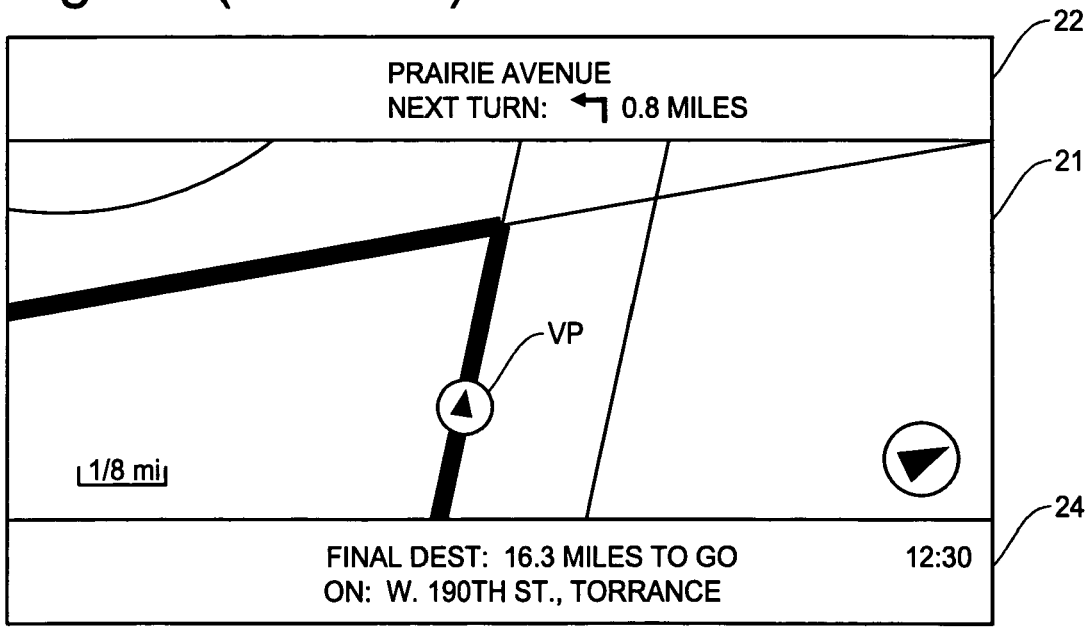
Figure 2A:
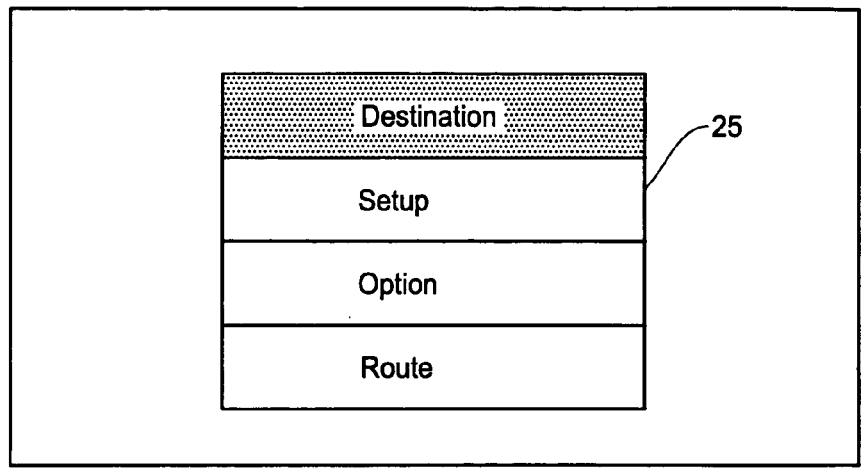
FIGS. 2A-2C are schematic diagrams showing display examples of a navigation system.
Figure 2B:
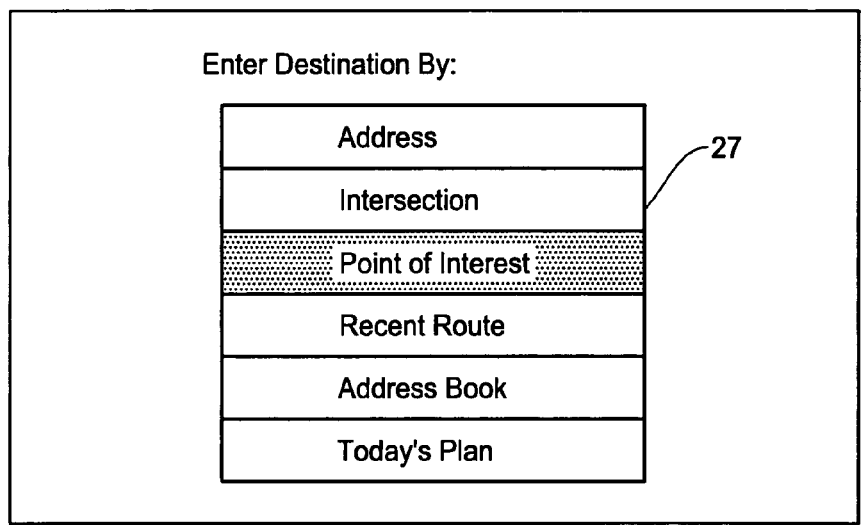
Figure 2C:
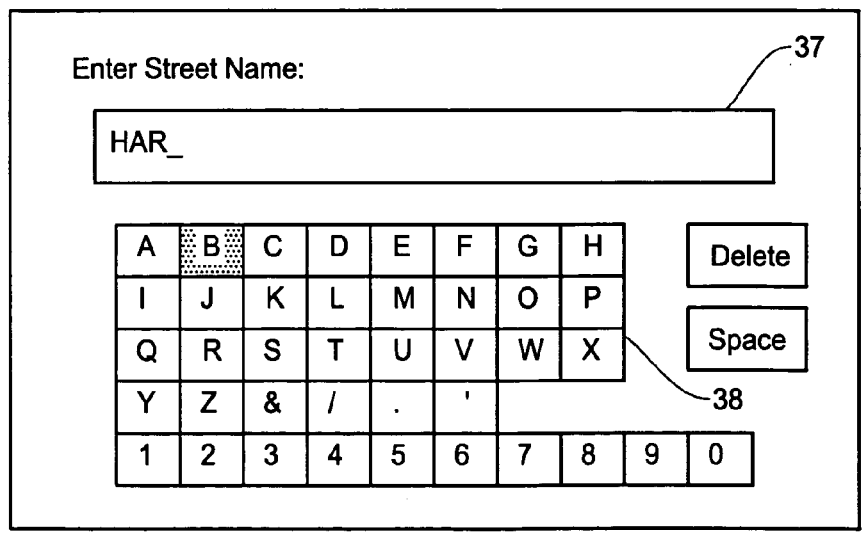

The display method and apparatus of the present invention will be described in more detail with reference to the accompanying drawings. While the present invention will be described in conjunction with the vehicle navigation system, it will be understood that the present invention is not limited to such a specific application. For example, the present invention can also be applicable to a portable (hand-held) navigation system, a portable data terminal such as a personal digital assistant (PDA), a lap top computer with a navigation function, and the like.

The navigation method and system of the present invention extract the map information, typically, POI (point of interest) information from a map data source quickly without requiring a large memory. The POI data is stored in the map data source with respect to each cell (region) where the whole country is divided into a large number of small cells. The size of such cells varies depending on the category (type) of POI so that a number of POIs in each cell will not exceed a predetermined maximum number. For example, since there are a large number of restaurants in the country, the size of the cells for the restaurant POIs is relatively small while the total number of restaurant POIs is large. In contrast, since the number of airports in the entire country is small, the size of the cells for the airport POI is considerably large while the total number of the airport POI is small.

In accordance with the present invention, for determining a destination, a user such as a driver specifies a category of POI to be listed on the display in the order of distance from the user. The navigation system aligns the cells each having specified POI information in an cell array and classifies the cells into a plurality of different levels based on a predetermined condition. For example, such classification is done based on the distance from the user's current position, or positions in the cell array relative to the closest cell to the user position.

The present invention involves a process of sorting the cells or POI information extracted from the cells by distance from a particular position such as a current user position or a vehicle position. It should be noted that the process of sorting the data by distance in the present invention is not limited to such a current vehicle position or a current user position, but can be applicable to any specified position. However, only for an illustration purpose, the following description will be made mainly with respect to a case of sorting the cells and POIs by distance from a current vehicle (user) position.

The navigation system extracts the POI information from the cells in the specified level, sorts them by distance from the current vehicle (user) position and displays the POI information sorted by distance. During this process, the navigation system retrieves and processes only an amount of POI data sufficient for the current display screen and immediate scrolls of screen that follow such as two or three pages of display. The navigation method and system of the present invention is described with reference to FIGS. 6-25.

Figure 4:
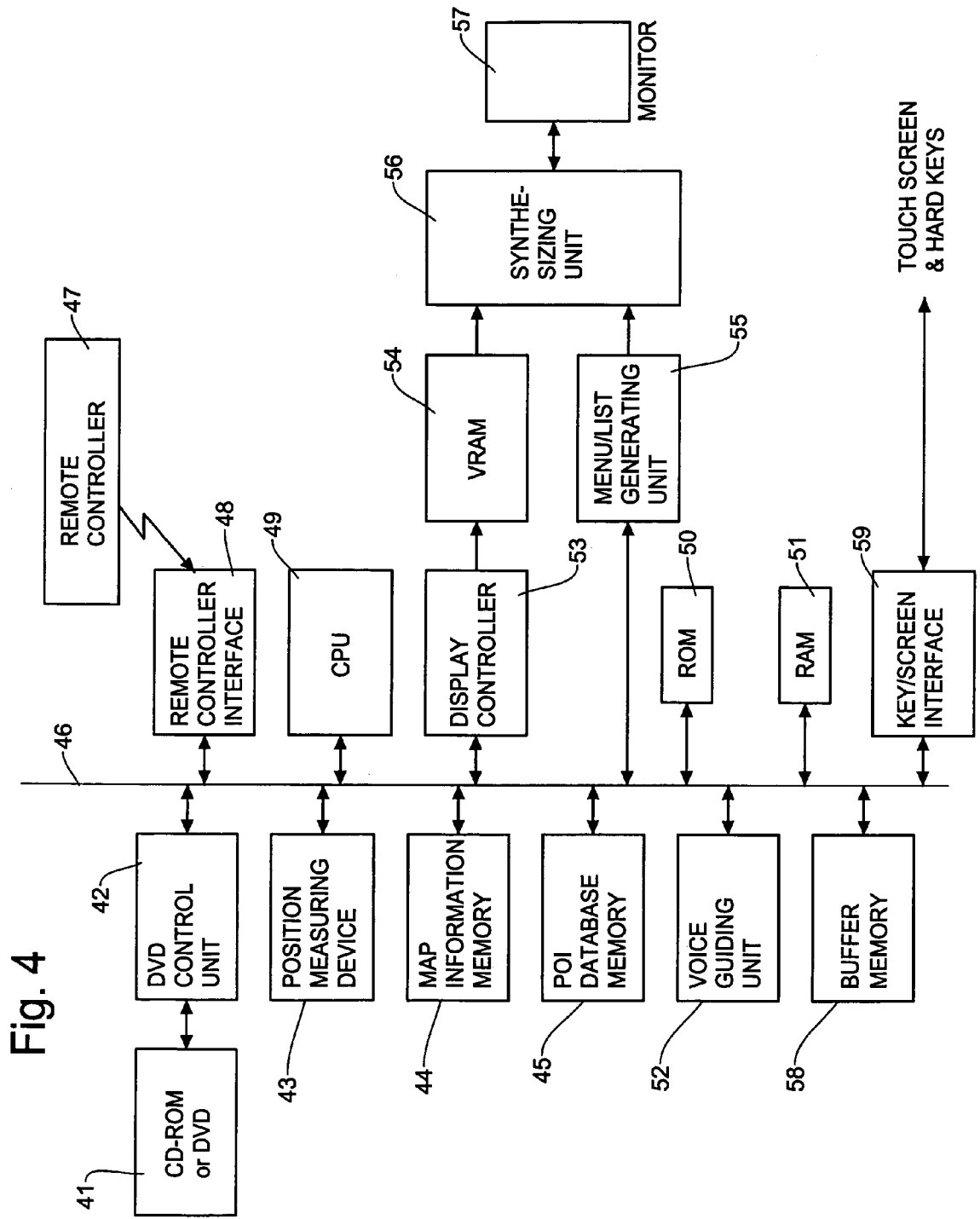
FIG. 4 is a block diagram showing an example of structure in the vehicle navigation system according to the present invention.
Figure 5A:
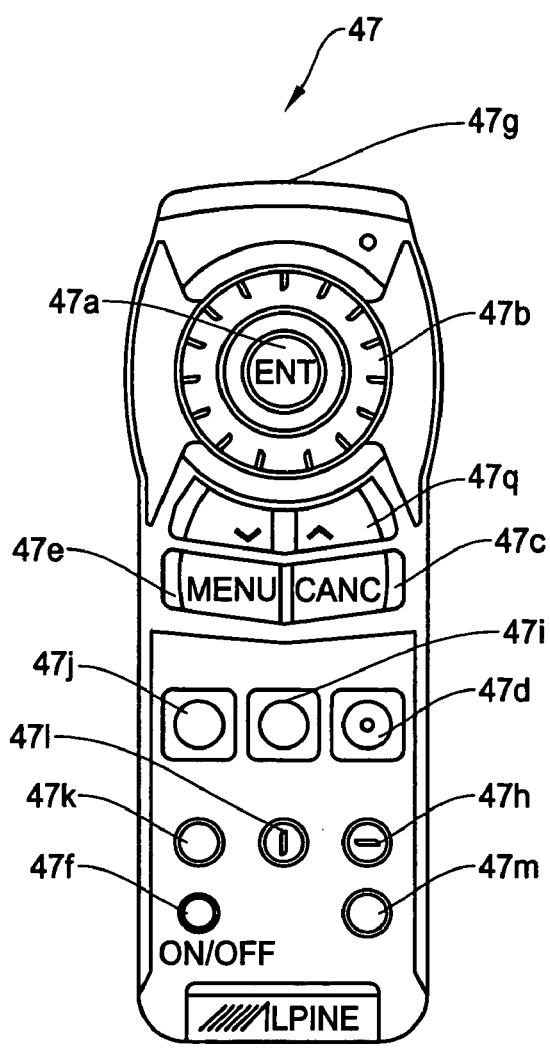
FIGS. 5A and 5B are diagrams showing an example of a remote controller accompanied by the vehicle navigation system of the present invention.
Figure 5B:
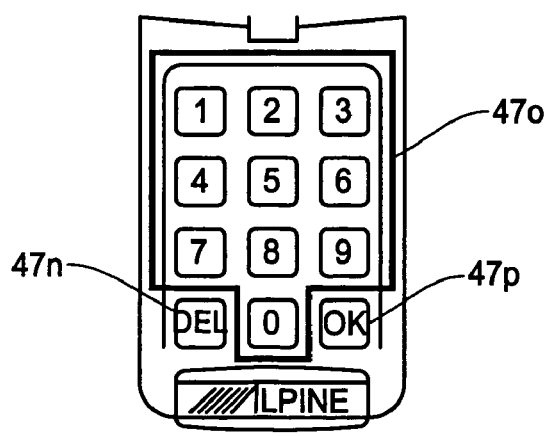

Before going into details of the POI searching and sorting method of the present invention, a brief description is made regarding the basic structure of the navigation system with reference to the block diagram of FIG. 4 and an example of remote controller for the navigation system with reference to FIGS. 5A and 5B.

In the block diagram of FIG. 4, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyroscope for detecting a moving direction, a microprocessor for calculating a position, a GPS receiver, and etc.

The block diagram of FIG. 4 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

The remote controller 47 has a variety of function keys as shown in FIG. 5A and numeric keys as shown in FIG. 5B. The numeric keys appear when a lid in the lower part of FIG. 5A is opened. The remote controller 47 includes a joystick/enter key 47a, a rotary encoder 47b, a cancel key 47c, an MP/RG key 47d, a menu key 47e, a zoom/scroll key 47q, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h starts the guidance to the route set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system includes various other input methods to achieve the same and similar operations done through the remote controller. For example, the navigation system includes hard keys and a joystick on a head unit of the navigation system mounted on a dash board, touch screen of the display panel, and voice communication means.

Referring back to FIG. 4, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a buffer memory 58 for temporarily storing data for calculating and adjusting an order of display of the POI information, and a key and screen interface 59 for interfacing with various other input means such as hard keys and joystick on a display panel of the navigation system or a touch screen of the navigation system, and the like.

Now, the navigation method and system of the present invention is described with reference to FIGS. 6-25. It should be noted that, in the following description of the invention, it is assumed that the POI information is stored in the data source relative to each cell where the whole territory of the U.S.A. is divided into a large number of small cells. The position of each cell is defined by latitude and longitude data indicating a corner of the cell and the size of each cell is defined by X and Y lengths of the cell. The number and size of the cells vary depending on the type of POI information.

FIG. 6 shows an example of cell array in the map data source where each cell has the same size for the same POI type and is designated by a cell ID in index data. The cells are designated by cell identification (ID) numbers 1-30. An example of map data source is a DVD (digital versatile disc) for a vehicle navigation system or a server storage when such map data is provided from a remote navigation server through communication system such as Internet. As noted above, in such a map data source, the covering area which is as large as a whole country is divided into a large number of cells.

When a user wants to find a destination, for example, a Japanese restaurant, he specifies a category "restaurant" and a sub-category "Japanese restaurant" as shown in FIGS. 3C and 3D. In the example of FIG. 6, it is assumed that the shaded cells have the specified POI information, for example, Japanese restaurant. A cell that has at least one specified POI is hereafter referred to as a "populated cell". Whether a particular cell is populated or not is known from the index data of the cell. In the present invention, the populated cells are detected and aligned in an array as shown in FIG. 7. Thus, the populated cells in FIG. 7 is the same as the shaded cells in FIG. 6.

In the first embodiment of the present invention, such populated cells are sorted by distance from the current user's position such as a vehicle position. FIG. 8 shows a process of sorting the cell array by the distance from the current vehicle position VP. Such a cell array also include a cell where the current vehicle is located if the cell is populated by the specified POI.

In this example, a predetermined distance d is used to produce layers of cells distinguished by distance numbers. For example, for the cells having at least one specified POI within the distance d from a predetermined location, typically a current vehicle position VP, a distance number "1" is given to such cells. For the cells having at least one specified POI within a distance 2d but outside the distance d from the vehicle position VP, a distance number "2" is given to such cells. If necessary, a distance 3d or higher is also examined and a distance number "3" or higher is given to the corresponding cells. Such distance numbers (layers) are determined based on the available number of POIs sufficient to display on the navigation screen when scrolled, such as several tens of POIs. In this manner, distance numbers are assigned to the populated cells based on the distance from the user's current position.

FIG. 9 shows a cell array sorted by the distance from the vehicle position (distance number) based on the process of FIG. 8. The navigation system retrieves the POIs contained in the cells selected in this manner. Then, the navigation system examines each POI's distance from the current user position and sorts the POIs in the order of the distance and displays on the display screen as a list of POIs. For example, the navigation system extracts and sorts several tens of POIs from the cells in the distance number "1" (first level), which are sufficient for the current display and immediate display scroll of two to several pages of screen. When the user further scrolls the display list, the navigation system retrieves the POIs from the cells in the distance number "2" (second level) and sorts them by the distance and displays on the screen.

Figure 10A:
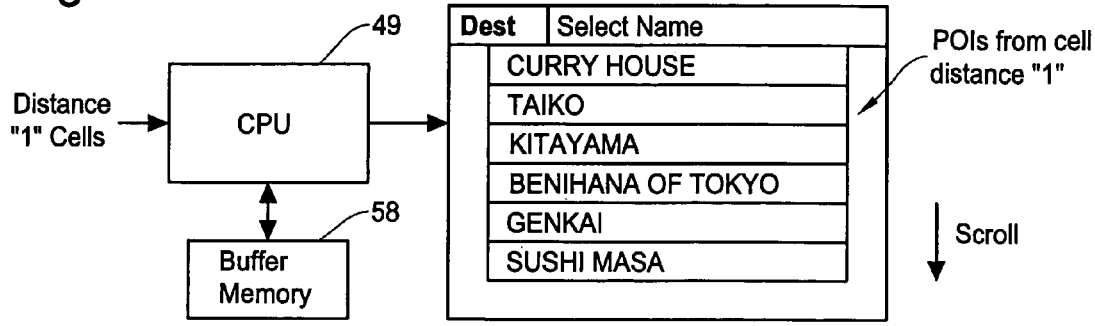
FIGS. 10A-10C are diagrams showing display examples when scrolling the POI information sorted by distance in accordance with the present invention.
Figure 10B:
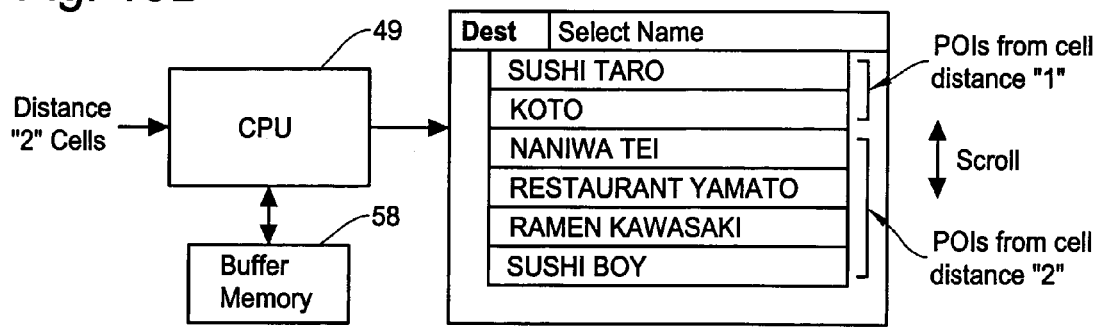
Figure 10C:
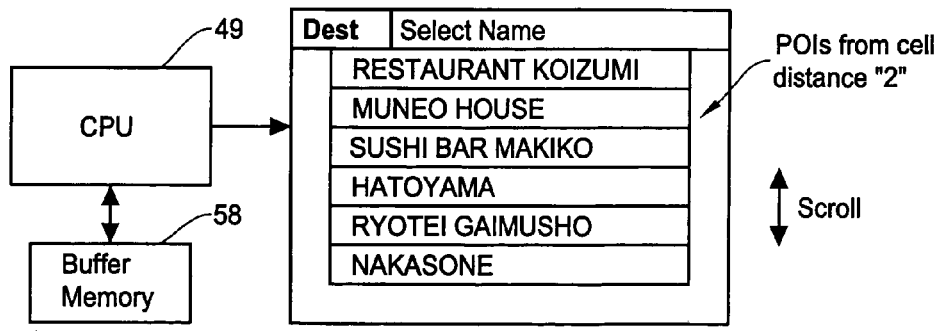

FIGS. 10A-10C show an example of procedure for retrieving, sorting and displaying the POI information. In this example, the CPU 49 and the buffer memory 58 of FIG.

4 are shown for sorting and temporarily storing the POI information. The navigation system (CPU 49) retrieves the POIs of all the cells that have the distance number "1" in the sorted distance cell array. In the above case of FIGS. 8 and 9, the navigation system retrieves the POI data in the cells 8, 10, 13, 16 and 21 with the distance number "1". After retrieving all the POIs in the first level (distance number "1"), the navigation system sorts the POIs by the distance to the current vehicle (user) position VP and sends only those POIs that are within the distance d from the user's position. Thus, a start list of FIG. 10A includes POIs (ex. Japanese restaurant) within the distance d displayed in the order the nearest to the user position.

If there are POIs within the cells of the distance number "1" but without the distance d from the current user position, such POIs will be temporarily stored in the buffer memory 58 and displayed in the next list. When the user scrolls the POIs list of FIG. 10A, the navigation system displays the remaining POIs within the distance d. If such POIs are exhausted, the navigation system retrieves the POIs in the cells of the distance number "2" as well as the POIs in the buffer memory 58. The navigation system combines them and sorts them by the distance from the user position VP. Thus, the POIs in the distance from the current position VP greater than or equal to the distance d and less than 2d are displayed as shown in FIG. 10B.

By further scrolling down the list, the navigation system retrieves the POIs in the remaining list corresponding to the distance number "2" and sorts them by the distance from the position VP. Thus, the POI list is displayed in the order of distance as shown in FIG. 10C where the POIs are within the distance 2d. In the examples of FIGS. 8-10, although the cells classified into only the distance d and 2d are used, the same procedure is applied to the other cells in the map data for the distance 3d or higher when the user wants to see more POIs.

As has been foregoing, in the present invention, populated cells are retrieved and sorted by distance, each POI in the sorted cells is further sorted by distance. In other words, the present invention incorporates two sorting operations, the first sorting operation is to sort the populated cells in the order of distance and to classify them into distance levels, and the second sorting operation to sort the POIs in the populated cells of selected distance level in the order of distance. Relatively small number of populated cells are retrieved which are sufficient to the current display and a small range of scroll such as several pages of display. Typically, several tens of POIs are sufficient for such a purpose. If the user further scrolls the display to see more POIs, the operation in the foregoing is repeated for the remaining cells.

While the conventional technology where the large number of POIs, such as one thousand (1,000) are first extracted and sorted by distance, the present invention processes only several tens of POIs. Accordingly, the navigation system can display the POI information quickly without requiring a large memory. Only when necessary, the navigation system extracts and process the next several tens of POIs. Since such a process can be conducted at high speed, the user does not feel that such scroll operation is done discontinuously.

In the foregoing process for sorting the populated cells by distance and further sorting the POIs retrieved from the sorted cells, there arises a case where POIs in a lower number group (such as the distance number "1") are located farther than POIs in a higher number group (such as the distance number "2" or higher) or vise versa. This situation arises because the shape of the cells is not a perfect square and a current vehicle position (user position) VP is not always at the center of a cell. In other words, it is not always correct to assume that the POIs left out from a level n group (distance number n) belong to a level n+1 group (distance number n+1), but such POIs could belong to a level n+i group (i)1).

Figure 11A:
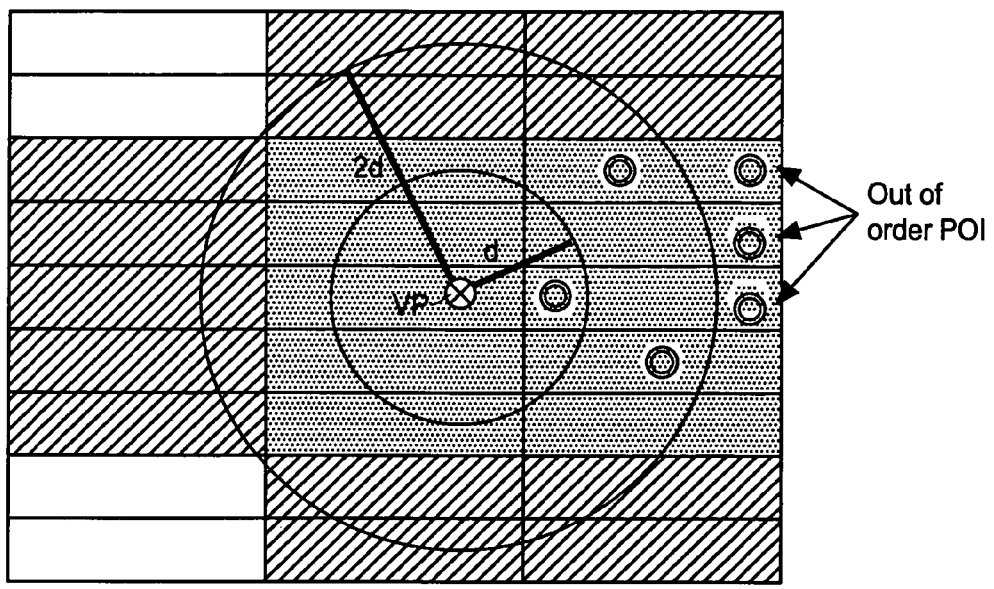
FIGS. 11A is a diagram showing a situation causing an accuracy problem in sorting the POI information by distance and FIG. 11B is a display example for correcting the accuracy problem in the present invention.

FIG. 11A shows an example of such a situation where cells are not in a square shape and the current vehicle position is not at the center of a cell. This example shows first level cells (dotted) of a distance d from the vehicle position VP and second level cells (hatched) of a distance 2d from the vehicle position VP. Because of the foregoing reasons, out of order POIs which are within the first level cells but their actual distances are even larger than the distance 2d may exist as shown in the right of FIG. 11A. The out of order POIs in this example should not be displayed with either distance d group POIs or distance 2d group POIs.

Figure 11B:
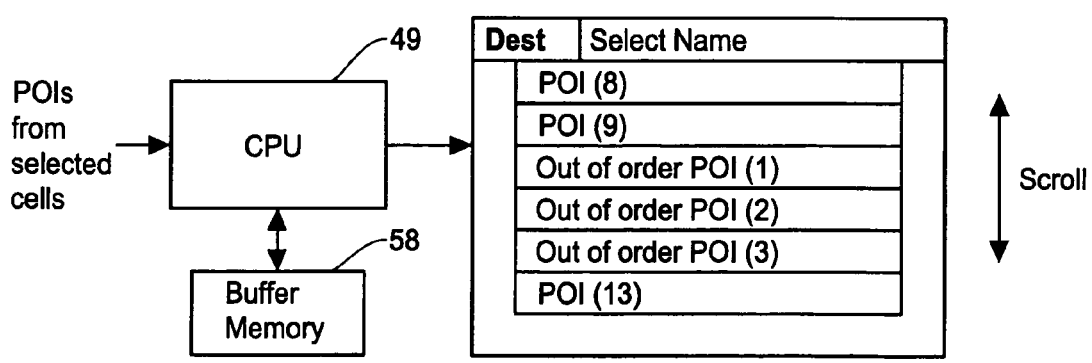

Such accuracy problems are solved by using the buffer memory as shown in FIG. 11B. When retrieving all the POIs from the previous level and sorting them by distance from the vehicle position, the out of order POIs having distances greater than the covering distance are removed and stored in the buffer memory 58. The navigation system displays a list of POIs sorted by distance from the vehicle position. When a user scrolls the list of display and thus a further list of POIs must be created, the navigation system retrieves the POIs from the next level while checks the buffer memory 58 and inserts any entry (out of order POIs 1-3 in FIG. 11B) that belongs to the next coverage area.

FIG. 12 is a diagram showing a matrix of cells and a current user (vehicle) position VP for explaining the second embodiment of the present invention. The second embodiment includes a process for reducing the number of populated cells to be sorted by distance before retrieving the POI information. POI categories such as restaurant (all types) have a large number of populated cells, for example, more than 70,000 in the entire country. Thus, even in creating a sorted by distance cell array such as shown in FIG. 9 takes several seconds or more if such a large number of cells have to be processed. As noted above, such a process of sorting by distance can be done based on any particular location that can be unrelated to the current user (vehicle) position. However, the description will be made with respect to a typical case where the current vehicle position is used as a reference for simplicity of explanation.

In such categories having a large number of POIs, it is usually-unnecessary to collect the POI information from the cells higher than a first or second level. In the present invention, rather than sorting the large number of populated cells by distance within the predetermined area, only a small number of cells in the populated cell array adjacent to the closest cell to the current vehicle position are selected in the first level to be sorted by distance. Then, the POI information is retrieved from the sorted cells in the first level. It should be noted that the populated cell array includes a cell where the current vehicle is located if the cell is populated by the specified POI.

In the second level, another set of small number of populated cells are selected from the populated cell array and sorted by distance before retrieving the POI information. Such selection of the populated cells from the populated cell array is done based on the order aligned in the cell matrix. Since this method does not sort the large number of populated cells at the same time, but sorts the small number of selected populated cells, an overall processing time is substantially decreased, thereby enabling to produce a list of POIs at high speed.

The populated cell array is shown in FIG. 13 where each cell has specified POIs such as restaurant. The cells in the populated cell array in FIG. 13 are aligned based on the position (in the order of cell ID number) in the cell matrix of FIG. 12 in which the populated cell are denoted by the shading. In FIGS. 12 and 13, suppose the populated cell 16 is closest to a specified location, such as a current vehicle (user) position VP, a predetermined number of populated cells adjacent to the closest cell 16 are selected to retrieve the POI information therefrom. If the vehicle is positioned on a populated cell, such a cell is the closest cell in this embodiment.

Such an example is shown in FIGS. 14A and 14B. In the populated cell array of FIG. 14A, the populated cell 16 and a predetermined number r of cells in the right and left directions of the array are selected as a first level. In this example, in addition to the cell 16, the navigation system selects the cells 21, 24 and 26 in the right direction and the cells 13, 11 and 10 in the left direction, i.e., seven cells where the predetermined number r is 3.

The selected populated cells in the first level are sorted by distance from the current vehicle position VP. Then, POIs in the selected cells are retrieved and sorted by distance from the vehicle position VP. In other words, the present invention incorporates three sorting operations, the first sorting operation is to select the populated cells in two or more levels, the second sorting operation is to sort the populated cells of selected level in the order of distance, and the third sorting operation to sort the POIs in the populated cells of selected distance level in the order of distance. Such a number of cells is determined so that a sufficient number of POIs, for example, several tens, can be retrieved from the selected cells of the first level for current display and immediate scrolls (ex. several pages of screen).

When the user further scrolls, and thus, the POIs retrieved in the first level are insufficient or exhausted, the navigation system retrieves the POIs from the cells in the second level shown in FIG. 14B. The cell array of FIG. 14B shows populated cells remained from the first level of FIG. 14A. The navigation system determines which populated cell is closest to the current vehicle position. Suppose the cell 8 is the closest, a predetermined number of populated cells adjacent to the cell 8 are selected in the right and left direction of the array. Suppose the predetermined number r is 3, since there is only one cell (cell 28) in the right direction, additional number of cells are selected from the left direction. In this example, since the total number of remaining cells is six, i.e., less than seven, all of the cells are selected for being sorted by distance and retrieval of the POIs therefrom.

The POIs in the selected cells in the second level of FIG. 14B are retrieved and sorted by distance from the current vehicle position VP. The navigation system displays the POIs in the order of distance. When there are POIs retrieved in the first level have a distance larger than that retrieved in the second level, the navigation system will calculate and adjust the order of display by temporary storing such out of order POIs in the buffer memory as shown in FIG. 11B.

Figure 15:
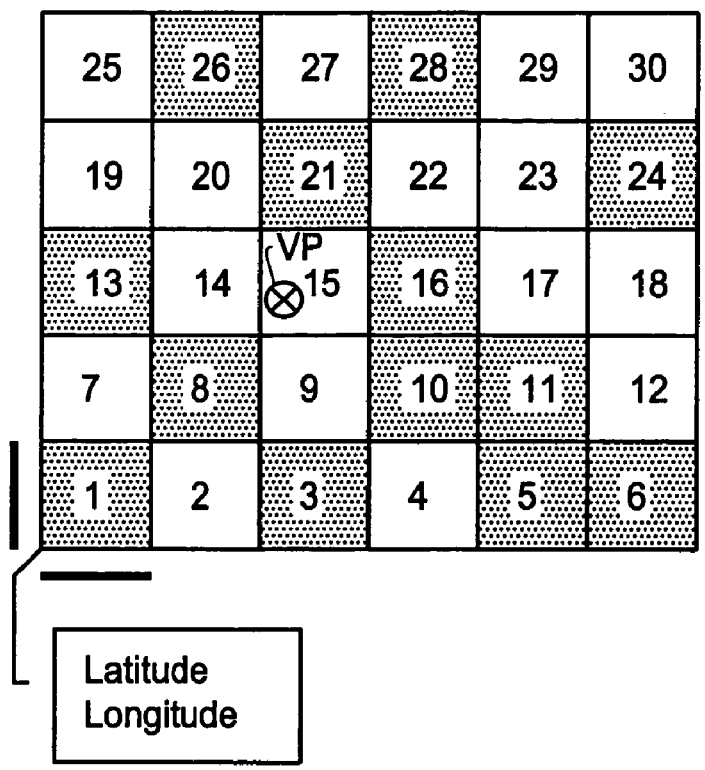
FIG. 15 is a diagram showing an array of cells and a current user (vehicle) position for explaining a process of determining the closest cell to the current user position using the latitude and longitude data in the second embodiment of the present invention.
Figure 16:
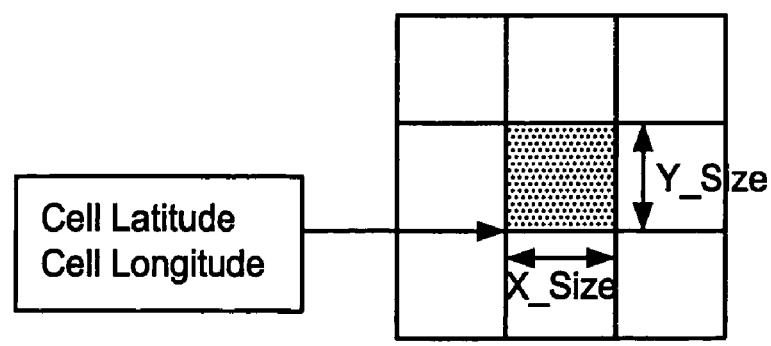
FIG. 16 is a diagram showing definition of a cell for determining a closet distance from the current user (vehicle) position in FIGS. 17A-17F.

In selecting the closest cell and adjacent cells in the present invention shown in FIGS. 12-14, it is important to determine which cell is the closest to a predefined location such as the current vehicle (user) position VP. FIGS. 15-17 show a method for determining a distance between the current vehicle position VP and a particular cell. By comparing the distances between the vehicle position VP and the cells, the navigation system is able to find the cell closest to the current vehicle position VP. Once the closest cell is determined, the process of FIG. 14A or 14B will be conducted for selecting the populated cells and retrieving the POIs from the selected cells and sorting them by distance.

FIG. 15 is a diagram showing an array of cells and a current user (vehicle) position VP for explaining a process of determining the closest cell to the current vehicle position using the latitude and longitude data. For example, as shown in FIG. 15, a position of a lower left corner of the cell matrix (collection of cells) is defined by latitude and longitude. In addition, each cell size is defined by X-size and Y-size, as shown in FIG. 16. Such data showing the latitude and longitude and X and Y sizes are given for each type of POIs in the map data storage (ex. DVD). The map data further includes cell IDs, a total number of cells in X direction and a total number of cells in Y direction.

As noted above, the cell size, i.e., the overall number of cells, and the position of the cell vary depending on the type of POIs stored in the map data storage. For the type of POIs having a large number of them distributed throughout the country, such as restaurant, the cell size is small, while the type of POIs with a small total number, such as an airport, the cell size is large. Further, since the cell is not always square, X-size and Y-size are not identical.

At any rate, since the latitude and longitude of the lower left corner point of the cell matrix, a horizontal size (X-size) and a vertical size (Y-size) of each cell, a cell ID of each cell, the total number of cells in the X direction and the total number cells in Y direction are respectively known, it is possible to determine any point on a particular cell for evaluating a shortest distance to the vehicle position VP. Thus, by comparing the shortest distance of each cell, the navigation system is able to find the closest populated cell, such as the cell 16 (first level) and the cell 8 (second level) in the example of FIGS. 12-14. Once the closest cell is determined, the process of FIG. 14A or 14B will be conducted for retrieving the POIs from the selected cells and sorting them by distance.

FIGS. 17A-17H show various situations for determining a closest distance of a particular cell from the current vehicle position VP. In the various situations between the vehicle position VP and a particular cell shown FIGS. 17A-17H, it is possible to find a closest point of the particular cell to the vehicle position VP as follows:

(1) If the VP latitude is smaller than the cell lower (bottom) latitude and the VP longitude is smaller than the cell left longitude, the closest point is the lower left corner of the cell as shown by the tip of the arrow in FIG. 17A.

(2) If the VP latitude is larger than the cell bottom latitude but smaller than the cell top latitude, and the VP longitude is smaller than the cell left longitude, the closest point is the VP latitude and the cell's left longitude as shown by the tip of the arrow in FIG. 17B.

(3) If the VP latitude is larger than the cell top latitude and the VP longitude is smaller than the cell left longitude, the closest point is the upper left corner of the cell as shown by the tip of the arrow of FIG. 17C.

(4) If the VP latitude is larger than the cell top latitude and the VP longitude is larger than the cell left longitude but smaller than the cell right longitude, the closest point is the VP longitude and the cell's top latitude as shown by the tip of the arrow of FIG. 17D.

(5) If the VP latitude is larger than the cell top latitude and the VP longitude is larger than the cell right longitude, the closest point is the upper right corner of the cell as shown by the tip of the arrow of FIG. 17E.

(6) If the VP latitude is larger than the cell bottom latitude but smaller than the cell top latitude, and the VP longitude is larger than the cell left longitude, the closest point is the VP latitude and the cell's right longitude as shown by the tip of the arrow of FIG. 17F.

(7) if the VP latitude is smaller than the cell bottom latitude and the VP longitude is larger than the cell right longitude, the closest point is the lower right corner of the cell as shown by the tip of the arrow of FIG. 17G.

(8) If the VP latitude is smaller than the cell bottom latitude and the VP longitude is larger than the cell left longitude but smaller than the cell right longitude, the closest point is the VP longitude and the cell's bottom latitude as shown by the tip of the arrow of FIG. 17H.

In this manner, the navigation system determines the closest point on the cell, i.e., a shortest distance from the vehicle position VP. By comparing the shortest distances among the populated cells, the closest populated cell such as the cells 16 and 8 in FIGS. 14A and 14B can be determined.

Figure 18:
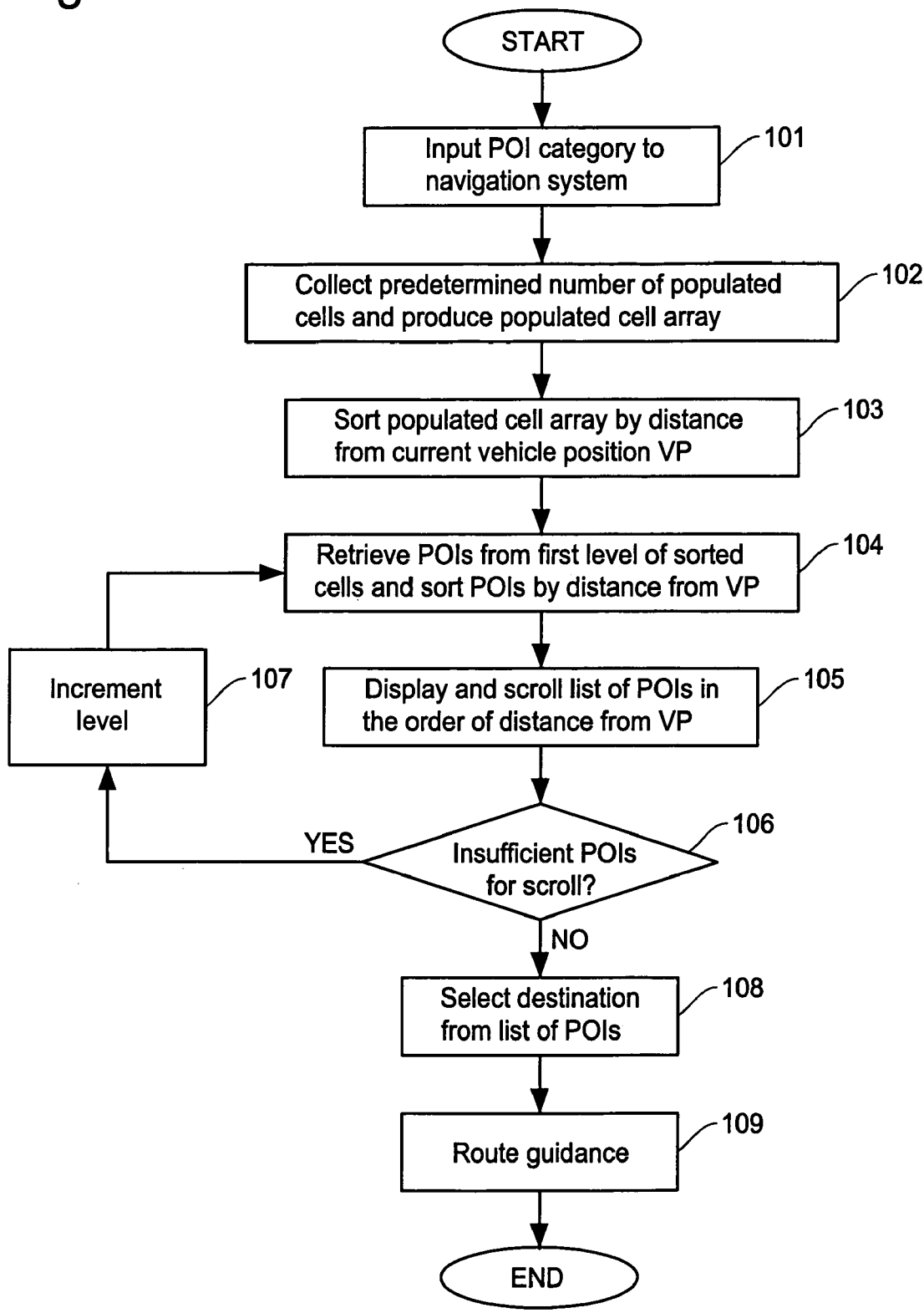
FIG. 18 is a flow chart showing an operation of the navigation method and apparatus of the present invention shown in FIGS. 6-10.

The flow chart of FIG. 18 summarizes the operation in the first embodiment of the present invention shown in FIGS. 6-11. In this embodiment, the populated cells are sorted by distance from a predetermined location such as a current vehicle (user) position before retrieving and sorting the POIs from the populated cells. This method is suitable when a number of populated cells to be considered is relatively small so that it will not require a long time for sorting the populated cells.

At the start, at step 101, the user specifies the POI category in the navigation system. In step 102, the navigation system collects a predetermined number of populated cells from the cell matrix in the map data storage such as DVD and produces a populated cell array such as shown in FIGS. 6 and 7. Then, the navigation system sorts the cells in the populated cell array by distance from the current vehicle position at step 103 in the manner shown in FIG. 9. Thus, the populated cells are classified into different levels, such as a first level, a second level, and etc., based on the distance from the current vehicle position VP.

In step 104, the navigation system retrieves the POIs from the sorted cells in the first level and sorts the retrieved POIs by distance from the current vehicle position VP. At step 105, the sorted POIs are displayed on the navigation system as a list of POIs in the order of distance. Typically, the navigation screen is designed to illustrate about 5-10 POIs in one screen (page). Thus, when the user scrolls the display, the navigation system displays further lists of POIs continuously, for example, two or three pages of screen.

If the user further scrolls the display, in step 106, the navigation system determines whether the POIs retrieved from the first level cells are insufficient or not for next display. If it is insufficient, the process goes back to the step 104 through a step 107 which increments the cell level by one to retrieve the POIs from the cells in the second level, and repeats the steps 104-106. This process is will be repeated if the user keeps scrolling the display.

Since the navigation system retrieves and processes a small number of POIs, such as several ten POIs at a time, the scroll operation is continuously and quickly conducted on the display without any noticeable waiting time. In the case where the POIs are sufficient at step 106, for example, the user does not scroll or stops the scrolling, the process moves to a step 108 where the user selects one of the POIs as her destination. Then the navigation system calculates the route to the destination and moves to the route guidance mode in step 109.

Figure 19:
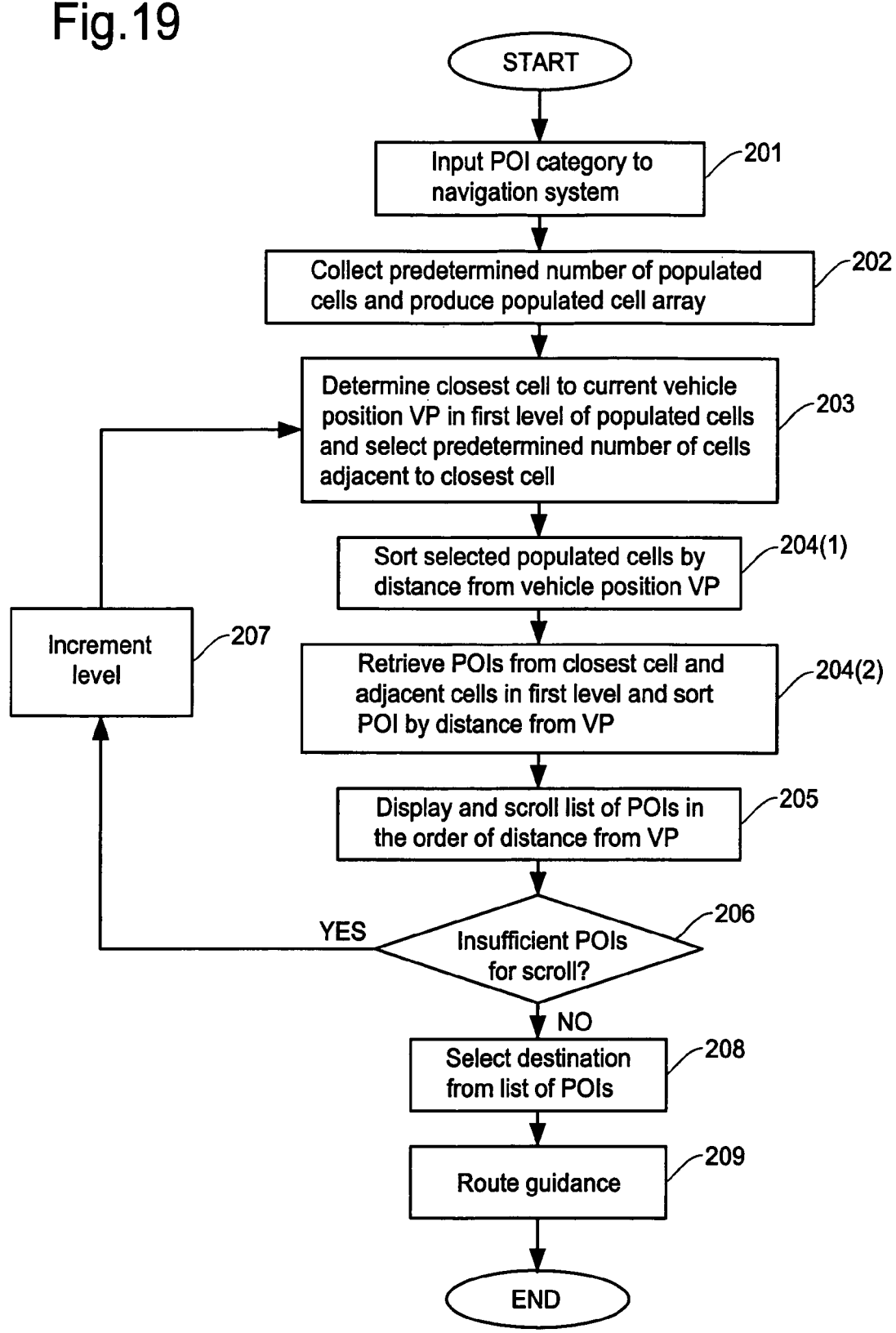
FIG. 19 is a flow chart showing an operation of the navigation method and apparatus of the present invention shown in FIGS. 12-17.
Figure 20:
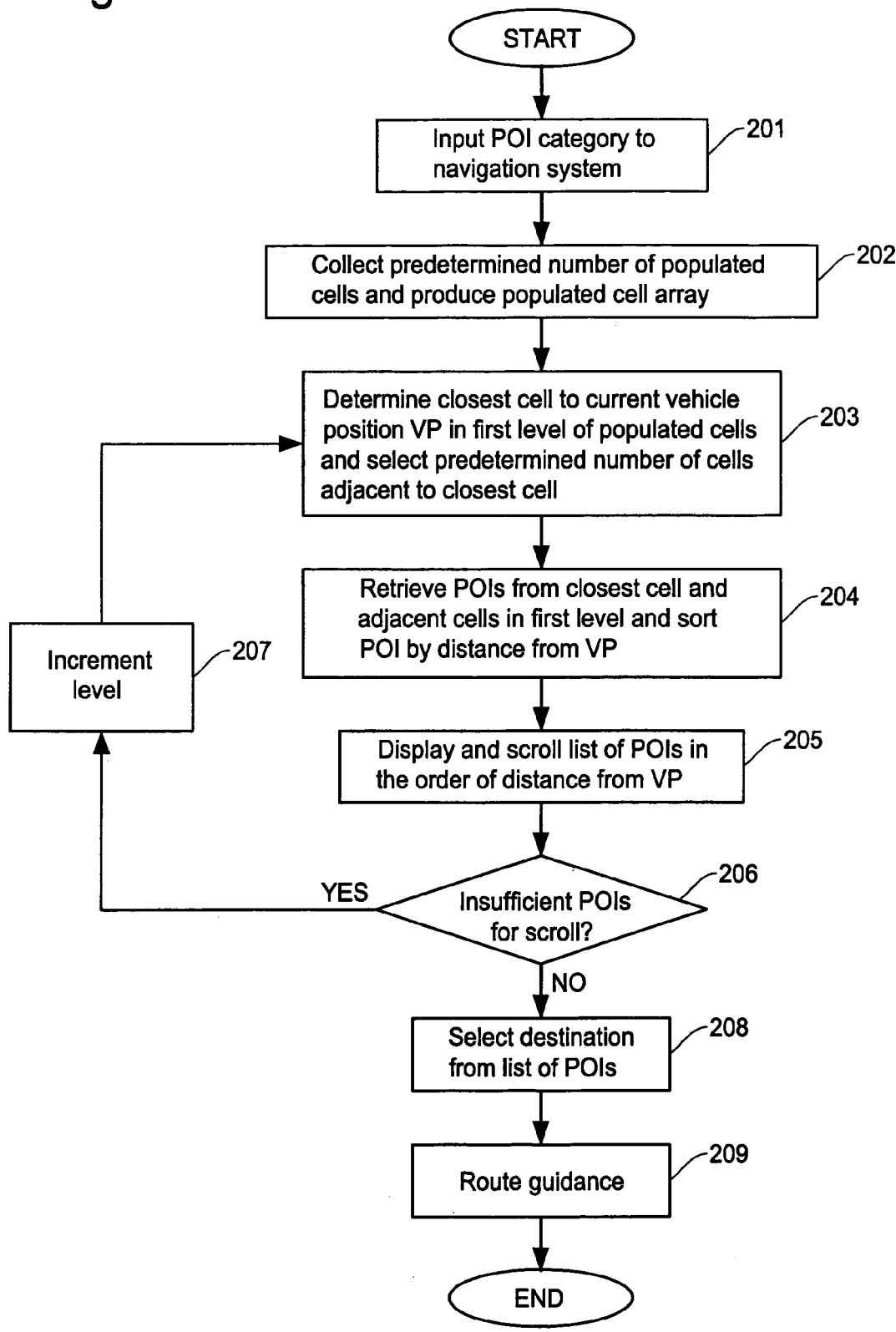
FIG. 20 is a flow chart showing another example of operation of the navigation method which is a modified version of the operation shown in FIG. 19.

The flow charts of FIGS. 19 and 20 summarize the operation in the second embodiment of the present invention shown in FIGS. 12-17 where the flow chart of FIG. 20 is a modified version of FIG. 19. In this embodiment, the number of populated cells is reduced before sorting the cells and retrieving the POIs by classifying the populated cells into two or more levels. Such classification is made in which the closet populated cell is determined in the populated cell array, the closest cell and a predetermined number of cells adjacent to the closest cell are selected. Two or more levels of populated cells are prepared in this manner for sorting the cells by distance for each level and retrieval of POIs therefrom. This method is suitable when a number of populated cells to be considered is relatively large so that it is necessary to reduce the time required for sorting the populated cells.

At the start, at step 201, the user specifies the POI category in the navigation system. In step 202, the navigation system collects a predetermined number of populated cells from the cell matrix in the map data storage such as DVD and produces a populated cell array such as shown in FIGS. 12 and 13. The cells in the populated cell array are aligned in the order determined by the cell matrix (order of ID number). Then, at step 203, the navigation system determines the closest cell in the populated cell array to the current vehicle position VP and selects the predetermined number of adjacent cells in the manner shown in FIGS. 14A and 14B. As a result, the populated cells are classified into different levels, such as a first level, a second level, and etc., based on the distance from the current vehicle position.

In step 204(1), the navigation system sorts the cells in the first level by distance from the current vehicle position. Then, in step 204(2), the navigation system retrieves the POIs from the sorted cells in the first level and further sorts the retrieved POIs by distance from the current vehicle position. At step 205, the sorted POIs are displayed on the navigation system as a list of POIs in the order of distance. As noted above, typically, the navigation screen is designed to illustrate 5-10 POIs in one screen (page). Thus, when the user scrolls the display, the navigation system displays further lists of POIs continuously, for example, two or three pages of screen.

If the user further scrolls the display, the navigation system determines whether the POIs retrieved from the first level cells are sufficient or not in step 206. If it is insufficient, the process goes back to the step 203 through a step 207 which increments the cell level by one to sort and retrieve the POIs from the cells in the second level and repeats the steps 203-206. This process will be repeated if the user keeps scrolling the display.

As noted above, since the navigation system retrieves and processes a small number of POIs, such as several ten POIs at a time, the scroll operation is continuously and quickly conducted on the display without any noticeable waiting time. In the case where the POIs are sufficient at step 206, for example, the user does not scroll or stops the scrolling, the process moves to a step 208 where the user selects one of the POIs as her destination. Then the navigation system calculates the route to the destination and moves to the route guidance mode in step 209.

The process of FIG. 20 is a modified version of the process of FIG. 19 in the second embodiment of the present invention. In this example, the step 204(1) in FIG. 19 for sorting the cells in the selected level by distance is removed from the process. Therefore, the navigation system retrieves the POIs from the cells in the first level which are aligned based on the order in the original cell matrix and sorts the retrieved POIs by distance from the current vehicle position. When more POIs are needed, the process goes back to the step 203 to determine the second level of populated cells based on the position in the populated cell array for retrieving the POIs from the cells. This process does not involve the process of sorting the populated cells, an overall process time can be significantly reduced.

FIGS. 21-25 are directed to the third embodiment of the present invention in which two levels of POI cells are used for the data retrieving and sorting. FIG. 21A shows a POI cell matrix of a first level, which corresponds to the POI cell matrix of FIGS. 6 and 12. FIG. 21B shows a populated cell array in which the cells having the specified POI information are aligned based on the order of ID number (positions in the original cell matrix). As noted above, when the number of populated cells is large, such as more than 70,000 for the case of restaurant, a process of sorting the populated cells takes a substantial time length. The third embodiment of the present invention provides a further method for reducing the overall processing time by using two levels of POI cell matrix.

Figures 21A, 21B:
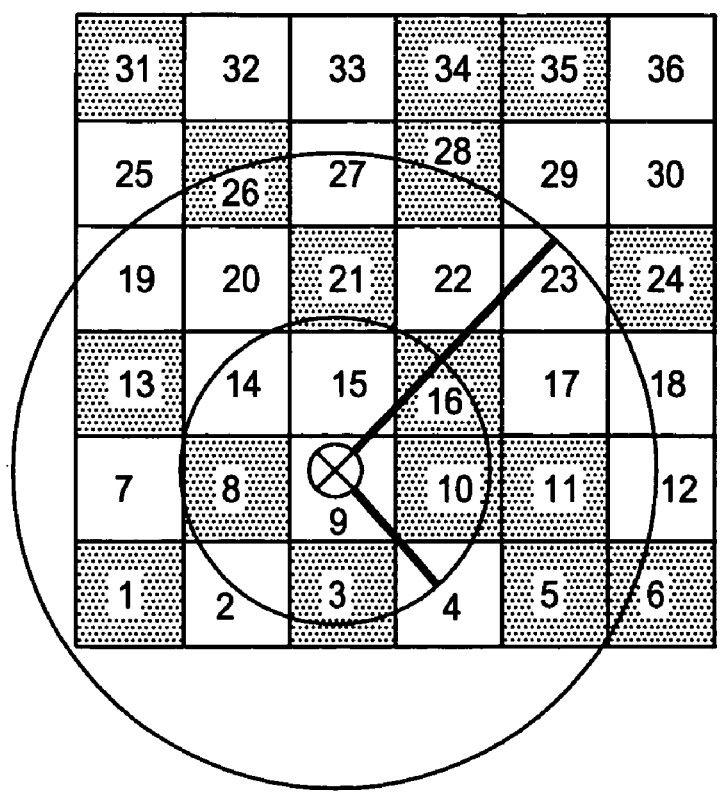
FIGS. 21A and 21B are diagrams showing a POI cell matrix and a populated POI cell array, respectively, of a first level, with respect to the third embodiment of the present invention.
Figures 22A, 22B:
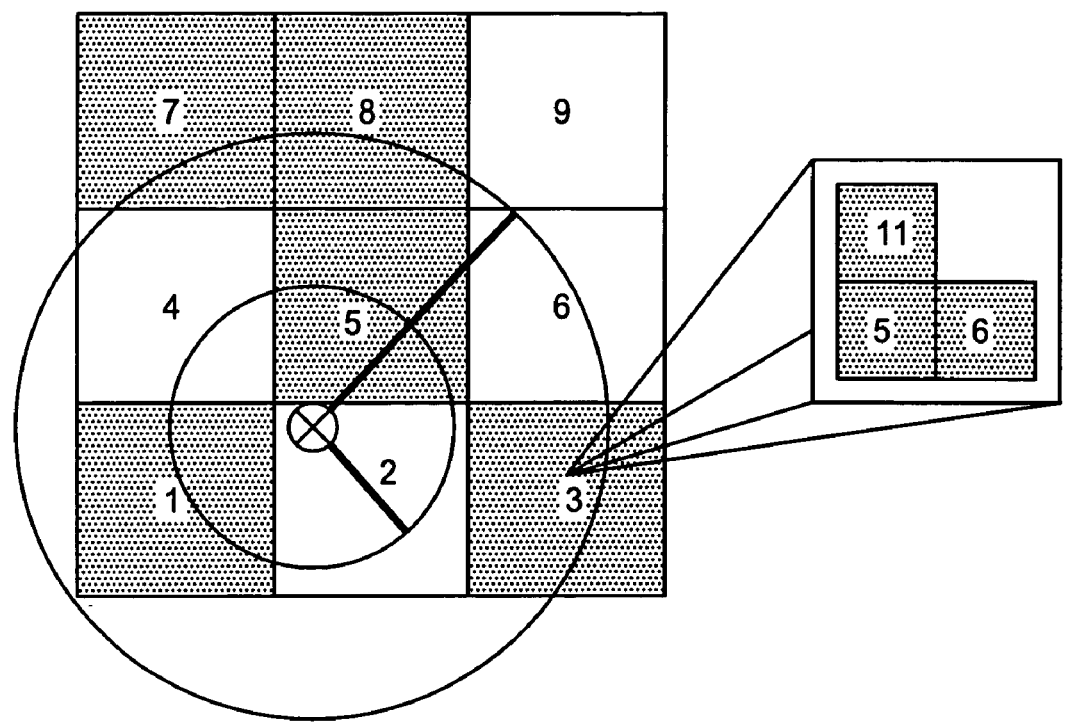
FIGS. 22A and 22B are diagrams showing a second level of a POI cell matrix and a populated POI cell array, respectively, which correspond to the first level of POI cells shown in FIGS. 21A and 21B in the third embodiment of the present invention.

FIGS. 22A and 22B show a second level of a POI cell matrix and a populated POI cell array, respectively, which correspond to the first level of POI cells shown in FIGS. 21A and 21B. In this example, each cell in the second level matrix of FIG. 22A covers four cells in the first level matrix of FIG. 21A. A cell 1 in the second level is populated and thus shaded in FIG. 22A since it includes the populated cell 1 in the first level. A cell 3 in the second level is populated and thus shaded in FIG. 22A since it includes the populated cells 5, 6 and 11 in the first level. In this manner, the populated cell array in the second level is created as shown in FIG. 22B.

The populated cells in the second level are sorted by distance as shown in FIG. 23. As noted above, such a process of sorting by distance can be done based on any particular location, typically from a current vehicle position but can be unrelated to the current vehicle position. However, the description will be made with respect to a typical case where the current vehicle position is used as a reference location for simplicity of explanation. It should also be noted that the populated cell array includes a cell where the current vehicle is located if such a cell is populated by the specified POI.

In the example of FIG. 23, the cells 1 and 5 in the second level are sorted to the distance level 1 and the cells 3, 7 and 8 in the second level are sorted to the second distance level 2. The cell 1 contains the populated cells 1 and 8 in the first level and the cell 5 contains the populated cells 16 and 21 in the first level. The populated cells 1, 8, 16 and 21 are sorted by distance from the current vehicle position as shown in FIG. 24. As a result of this sorting, it is determined that the populated cells 8, 16 and 21 are in the distance level 1. The navigation system retrieves the POIs in the cells 8, 16 and 21 and sorts the POIs by distance and displays the result on the navigation screen.

Similarly, with respect to the distance level 2 in FIG. 23, the cell 3 contains the populated cells 5, 6 and 11 in the first level, the cell 7 contains the populated cell 26 in the first level, and the cell 8 contains the populated cell 28 in the first level. The navigation system sorts the populated cells 5, 6, 11, 26 and 28 by distance and combines the results with that of FIG. 24 as shown in FIG. 25. Thus, if necessary, the navigation system retrieves the POIs from the cells in the distance level 2, i.e., cells 1, 5, 6, 11, 26 and 28, sorts them by distance and displays them on the navigation screen.

In the third embodiment of the present invention described above, the number of cells involved in each sorting operation is small because the initial sorting is done for the second level cells. Accordingly, an overall time required for sorting and displaying the POIs is substantially reduced. Thus, the navigation system can display the POI information sorted by distance from a specified position quickly without requiring a large memory or a high speed processor.

As has been foregoing, according to the present invention, the navigation method and system is designed to process a small amount of POI information which is immediately necessary for a practical use by a user. Accordingly, the navigation method and system is able to quickly retrieving, sorting and displaying the POI information without requiring a large memory or a high power computer. When it is really necessary, the navigation method and system repeats the extracting and sorting operations for the next level of POI information. Therefore, the present invention can provide a navigation system with high speed and low cost.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for displaying point of interest (POI) information for selecting a destination, comprising the following steps of:

specifying a category of POI in a navigation system for displaying a list of specified POIs;

collecting a predetermined number of populated cells from a cell matrix and producing an array of populated cells where a populated cell is a cell having at least one POI of specified category therein;

conducting a first sorting operation for sorting the populated cells in the populated cell array by distance from a predetermined position irrespective of numbers of POIs in the populated cells;

retrieving the specified POIs from a first distance level of sorted populated cells and conducting a second sorting operation for sorting the retrieved POIs by distance from the predetermined position;

displaying and scrolling a list of specified POIs in the order of distance from the predetermined position; and repeating foregoing steps for a next distance level of populated cells when POIs to be displayed are insufficient for further scroll request.

2. A navigation method as defined in claim 1, wherein said step of collecting the populated cells includes a step of determining the predetermined number of populated cells based on a particular kind of POI category specified by a user in such a way to retrieve a sufficient number of specified POIs to be displayed and scrolled on a screen of the navigation system.

3. A navigation method as defined in claim 2, wherein said sufficient number of specified POIs is about several tens, which are displayed on the screen as the list of POIs with several pages of scroll.

4. A navigation method as defined in claim 1, wherein said step of conducting the second sorting operation for sorting the retrieved POIs by distance from the predetermined position includes a step of detecting an out of order POI having a distance from the predetermined position larger than the first distance level and temporarily storing the out of order POI in a buffer memory.

5. A navigation method as defined in claim 4, wherein said out of order POI is retrieved from the buffer memory and inserted in a list of POIs extracted from the next or higher distance level of populated cells to be displayed in the order of distance from the predetermined position.

6. A navigation method for displaying point of interest (POI) information for selecting a destination, comprising the following steps of:

specifying a category of POI in a navigation system for displaying a list of specified POIs;

collecting a predetermined number of populated cells from a cell matrix formed in a map data storage and producing an array of populated cells where a populated cell is a cell having at least one POI of specified type therein, wherein the cells in the populated cell array are aligned based on positions in the cell matrix;

determining a populated cell which is closest to a predetermined position and conducting a first sorting operation by selecting a prescribed number of populated cells adjacent to the closest populated cell irrespective of numbers of POIs in the populated cells to establish a first level of populated cells consisting of the closest populated cell and the adjacent populated cells;

retrieving the specified POIs from the first level of cells and conducting a third sorting operation for sorting the retrieved POIs by distance from the predetermined position;

displaying and scrolling a list of specified POIs in the order of distance from the predetermined position; and repeating foregoing steps for a next level of populated cells when POIs to be displayed are insufficient for further scroll request.

7. A navigation method as defined in claim 6, further comprising a step of conducting a second sorting operation for sorting the populated cells in the first level by distance from the predetermined position before retrieving the POIs from the populated cells.

8. A navigation method as defined in claim 6, wherein said step of determining the closest populated cell to the predetermined position includes a step of finding a shortest distance from the predetermined position to each of the populated cells and comparing the shortest distance of each populated cell.

9. A navigation method as defined in claim 6, wherein said step of collecting the populated cells includes a step of determining the predetermined number of populated cells based on a particular kind of POI category specified by a user in such a way to retrieve a sufficient number of specified POIs to be displayed and scrolled on a screen of the navigation system.

10. A navigation method as defined in claim 9, wherein said sufficient number of specified POIs is about several tens, which are displayed on the screen as the list of POIs with several pages of scroll.

11. A navigation method as defined in claim 6, wherein said step of conducting the third sorting operation for sorting the retrieved POIs by distance from the predetermined position includes a step of detecting an out of order POI having a distance from the predetermined position larger than a first distance level and temporarily storing the out of order POI in a buffer memory.

12. A navigation method as defined in claim 11, wherein said out of order POI is retrieved from the buffer memory and inserted in a list of POIs extracted from the next or higher level of populated cells to be displayed in the order of distance from the predetermined position.

13. A navigation method for displaying point of interest (POI) information for selecting a destination, comprising the following steps of:

specifying a category of POI in a navigation system for displaying a list of specified POIs;

defining a first level cell matrix formed in a map data storage and a second level cell matrix where each cell in the second level cell matrix corresponds to a plurality of cells in the first level cell matrix;

collecting a predetermined number of first level populated cells from the first level cell matrix by collecting a predetermined number of second level populated cells from the second level cell matrix where a populated cell is a cell having at least one specified POI therein;

sorting the second level populated cells by distance from a predetermined position irrespective of numbers of POIs in the populated cells to determine the second level populated cells in a first distance level and the second level populated cells in a second distance level;

retrieving the first level populated cells corresponding to the sorted second level populated cells in the first distance level and sorting the first level populated cells by distance from the predetermined position;

retrieving the specified POIs from the first level populated cells in the first distance level and sorting the retrieved POIs by distance from the predetermined position;

retrieving the first level populated cells corresponding to the sorted second level populated cells in the second distance level and sorting the first level populated cells by distance from the predetermined position;

retrieving the specified POIs from the first level populated cells in the second distance level and sorting the retrieved POIs by distance from the predetermined position;

combining the POIs sorted by distance for the first distance level and the POIs sorted by distance for the second distance level; and displaying and scrolling a list of specified POIs in the order of distance from the predetermined position.

14. A navigation system for displaying point of interest (POI) information for selecting a destination, comprising:

means for specifying a category of POI in a navigation system for displaying a list of specified POIs;

means for collecting a predetermined number of populated cells from a cell matrix and producing an array of populated cells where a populated cell is a cell having at least one POI of the specified category therein;

means for conducting a first sorting operation for sorting the cells in the populated cell array by distance from a predetermined position irrespective of numbers of POIs in the populated cells;

means for retrieving the specified POIs from a first distance level of sorted populated cells and conducting a second sorting operation for sorting the retrieved POIs by distance from the predetermined position;

means for displaying and scrolling a list of specified POIs in the order of distance from the predetermined position; and means for repeating foregoing operations for a next distance level of populated cells when POIs to be displayed are insufficient for further scroll request.

15. A navigation system as defined in claim 14, wherein said means for collecting the populated cells includes means for determining the predetermined number of populated cells based on a particular kind of POI category specified by a user in such a way to retrieve a sufficient number of specified POIs to be displayed and scrolled on a screen of the navigation system.

16. A navigation system as defined in claim 15, wherein said means for conducting the second sorting operation for sorting the retrieved POIs by distance from the predetermined position includes means for detecting an out of order POI having a distance from the predetermined position larger than the first distance level and temporarily storing the out of order POI in a buffer memory.

17. A navigation system as defined in claim 16, wherein said out of order POI is retrieved from the buffer memory and inserted in a list of POIs extracted from the next or higher distance level of populated cells to be displayed in the order of distance from the predetermined position.

18. A navigation system for displaying point of interest (POI) information for selecting a destination, comprising:
　　means for specifying a category of POI in a navigation system for displaying a list of specified POIs;
　　means for collecting a predetermined number of populated cells from a cell matrix formed in a map data storage and producing an array of populated cells where a populated cell is a cell having at least one POI of specified category therein, wherein the cells in the populated cell array are aligned based on positions in the cell matrix;
　　means for determining a populated cell which is closest to a predetermined position and conducting a first sorting operation by selecting a prescribed number of populated cells adjacent to the closest populated cell in the populated cell array irrespective of numbers of POIs in the populated cells to establish a first level of populated cells consisting of the closest populated cell and the prescribed number of adjacent populated cells;
　　means for retrieving the specified POIs from the first level of cells and conducting a third sorting operation for sorting the retrieved POIs by distance from the predetermined position;
　　means for displaying and scrolling a list of specified POIs in the order of distance from the predetermined position; and
　　means for repeating foregoing steps for a next level of populated cells when POIs to be displayed are insufficient for further scroll request.

19. A navigation system as defined in claim 18, further comprising means for conducting a second sorting operation for sorting the populated cells in the first level by distance from the predetermined position before retrieving the POIs from the populated cells.

20. A navigation method as defined in claim 18, wherein said means for determining the closest populated cell to the predetermined position includes means for finding a shortest distance from the predetermined position to each of the populated cells and comparing the shortest distance of each populated cell.

21. A navigation system as defined in claim 18, wherein said step of collecting the populated cells includes means for determining the predetermined number of populated cells based on a particular kind of POI category specified by a user in such a way to retrieve a sufficient number of specified POIs to be displayed and scrolled on a screen of the navigation system.

22. A navigation system as defined in claim 18, wherein said means for conducting the third sorting operation for sorting the retrieved POIs by distance from the predetermined position includes means for detecting an out of order POI having a distance from the predetermined position larger than a first distance level and temporarily storing the out of order POI in a buffer memory.

23. A navigation system as defined in claim 22, wherein said out of order POI is retrieved from the buffer memory and inserted in a list of POIs extracted from the next or higher level of populated cells to be displayed in the order of distance from the predetermined position.

24. A navigation system for displaying point of interest (POI) information for selecting a destination, comprising:
　　means for specifying a category of POI in a navigation system for displaying a list of specified POIs;
　　means for defining a first level cell matrix formed in a map data storage and a second level cell matrix where each cell in the second level cell matrix corresponds to a plurality of cells in the first level cell matrix;
　　means for collecting a predetermined number of first level populated cells from the first level cell matrix by collecting a predetermined number of second level populated cells from the second level cell matrix where a populated cell is a cell having at least one specified POI therein;
　　means for sorting the second level populated cells by distance from a predetermined position irrespective of numbers of POIs in the populated cells to determine the second level populated cells in a first distance level and the second level populated cells in a second distance level;
　　means for retrieving the first level populated cells corresponding to the sorted second level populated cells in the first distance level and sorting the first level populated cells by distance from the predetermined position;
　　means for retrieving the specified POIs from the first level populated cells in the first distance level and sorting the retrieved POIs by distance from the predetermined position;
　　means for retrieving the first level populated cells corresponding to the sorted second level populated cells in the second distance level and sorting the first level populated cells by distance from the predetermined position;
　　means for retrieving the specified POIs from the first level populated cells in the second distance level and sorting the retrieved POIs by distance from the predetermined position;
　　means for combining the POIs sorted by distance for the first distance level and the POIs sorted by distance for the second distance level; and
　　means for displaying and scrolling a list of specified POIs in the order of distance from the predetermined position.

* * * * *